INVENTORS.
DAVID E. ALDRICH
ANDRÉ P. BIGNON
BY
ATTORNEY

INVENTORS.
DAVID E. ALDRICH
ANDRÉ P. BIGNON
BY William R. Lerry
ATTORNEY

United States Patent Office 2,949,007
Patented Aug. 16, 1960

2,949,007

ROCKET ENGINE FEED SYSTEM

David E. Aldrich, Whittier, and André P. Bignon, Reseda, Calif., assignors to North American Aviation, Inc.

Filed Feb. 24, 1955, Ser. No. 490,518

4 Claims. (Cl. 60—35.6)

This invention is directed to a rocket engine feed system having extreme simplicity of operation. More specifically, the invention concerns a rocket engine in which there are no electrical ignition devices nor any complex electronic transition-sequencing devices.

Rocket engines of varying thrust generally suffer from the fact that they are exceedingly complex. The factors affecting this complexity include the heretofore necessary electrical ignition systems, the control system, the several sequencing manipulations necessary by the pilot or automatic device, the particular characteristics of the propellent combination, and the necessity for various protective devices. The rocket engine of the present invention uses propellent combinations which eliminate electrical ignition devices without entailing the use of dangerous and highly corrosive hypergolic fuels. The feed system of the present rocket engine is sequenced in an automatic manner by the building up of predetermined pressures in the preceding step eliminating complex electronic transition-sequencing devices. Furthermore, the present rocket engine may be operated merely by the actuation of a single switch.

An object of this invention is to provide a new and novel rocket engine.

A further object of this invention is to provide a simplified rocket engine feed system.

A still further object of this invention is to provide a simplified rocket engine having reliable starting characteristics and smooth, steady operation.

An additional object of this invention is to provide a simplified bipropellent rocket engine having a monopropellent and a liquid propellant fuel and oxidizer combination.

A further object of this invention is to provide a rocket engine feed system having simplified operation and inherent fail-safe characteristics.

A still further object of this invention is to provide a rocket engine capable of safe and clean shut-downs allowing repeatable operation with a minimum of manual participation.

An additional object of this invention is to provide a rocket engine having stable combustion characteristics and simplified variable thrust control.

A still further object of this invention is to provide a new and novel method of operating a rocket engine.

Figure 1:
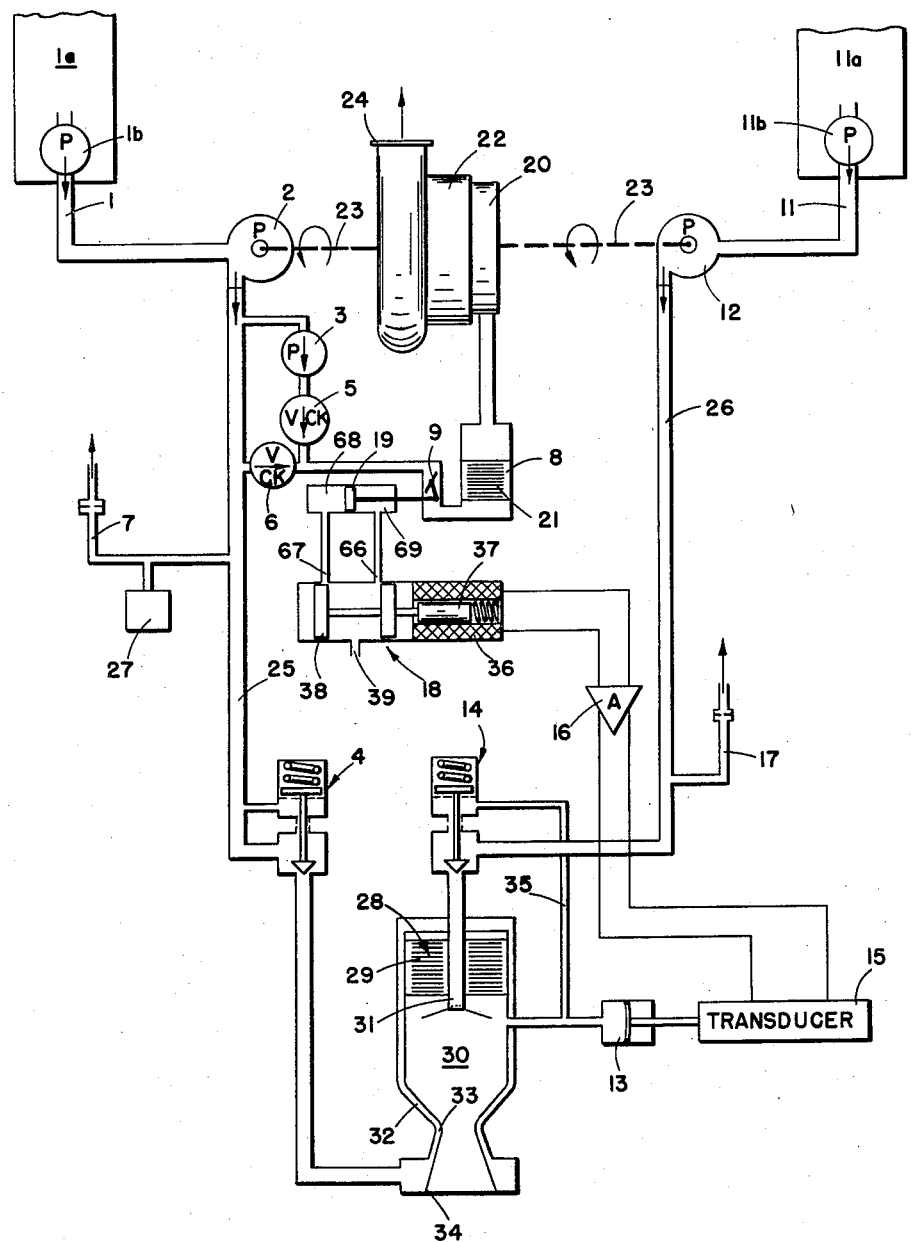
Figure 2:
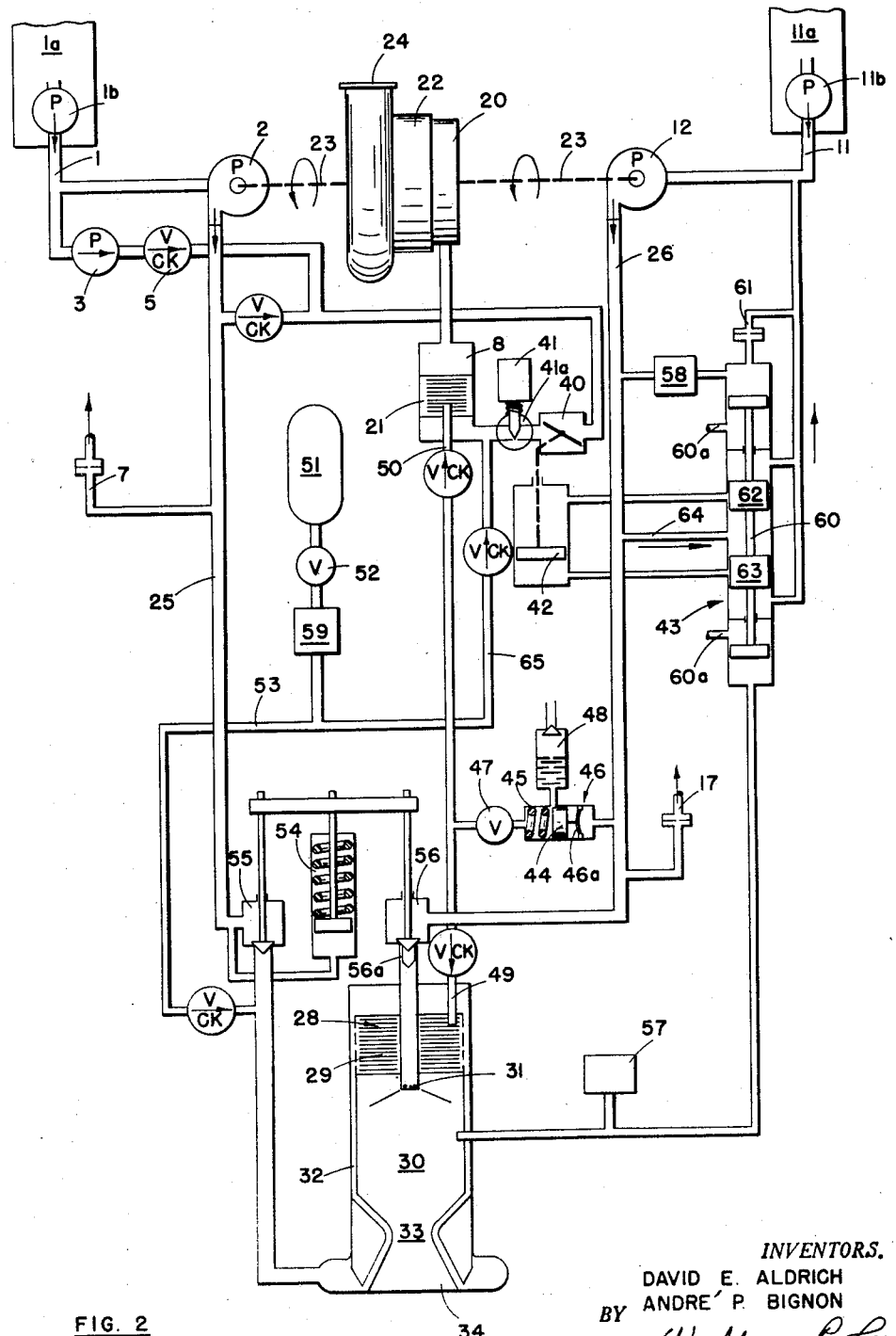

The above objects as well as other objects of this invention will be apparent from the following specification and drawings, in which:

Fig. 1 schematically shows the preferred rocket engine feed system;

Fig. 2 schematically shows a modified form of rocket engine feed system; and

Figure 3:
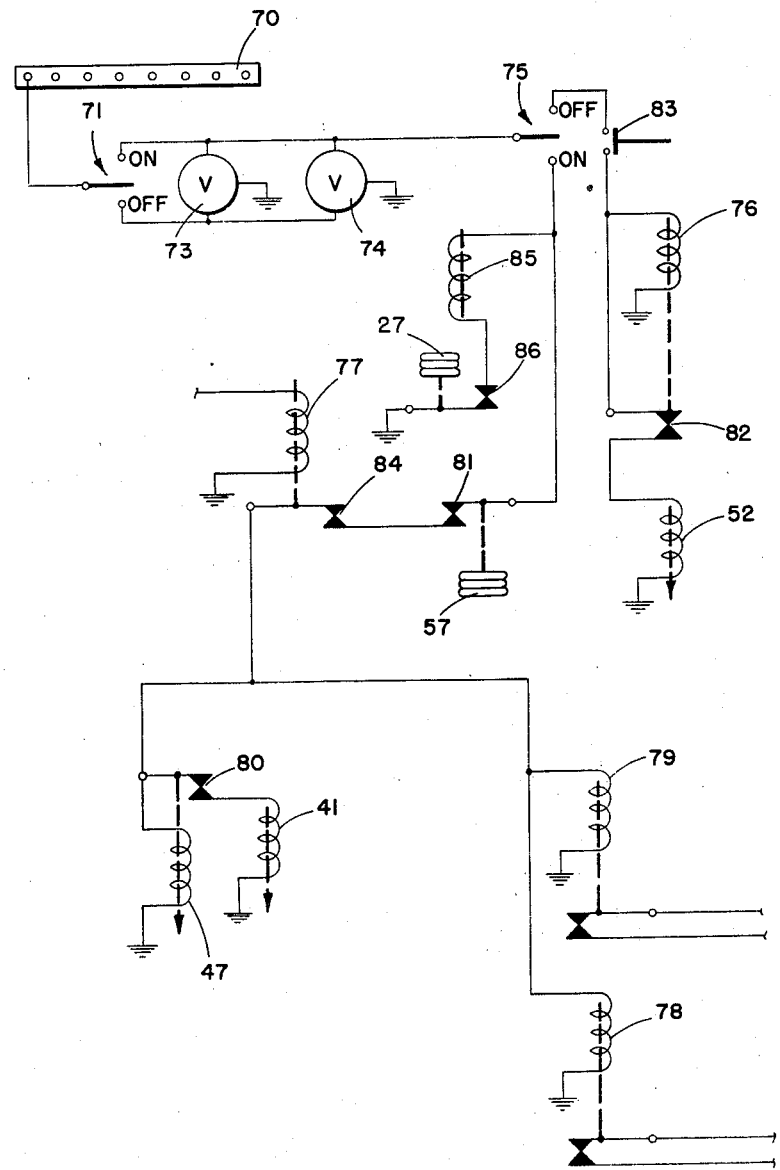

Fig. 3 shows an electrical schematic diagram of the system illustrated in Fig. 2.

The above objects of this invention are attained generally by the use of a monopropellant as one of the components of the over-all propellent combination, and the simplified control of the injection of this monopropellant and a liquid propellant into the thrust chamber of the rocket engine based upon the build-up of certain pressures in the feed system. The term "monopropellant" is herein defined as a substance in liquid form which is capable of being catalytically decomposed into fractions having the properties of a fuel and an oxidizer. Monopropellants, however, are not prefect propellants in themselves but are deficient in either their fuel or oxidizer fractions.

The present rocket engine and its feed system is actuated normally by two switches, one an "arm" switch which opens inlet valves from a monopropellent tank 1a or source and form a liquid propellant tank 11a or source, and starts booster pumps 1b, and 11b in each tank, respectively, the other a "fire" switch which starts a starting pump 3 to initiate the thereafter automatic firing cycle of the rocket engine. The liquid propellant mentioned herein may be an oxidizer or a fuel dependent on the particular deficiency of the chosen monopropellant.

Operation of the rocket engine and feed system shown in Fig. 1 is as follows: the starting pump 3 draws monopropellant from its source, tank 1a, through the inlet 1 and through monopropellent pump 2. At this time the main monopropellent valve 4 is in a closed position. Upon the arming of the rocket engine feed system, by closing the "arm" switch, the monopropellant and other propellant will flow through the turbo pumps 2 and 12 and all the plumbing up to the gas generator check valves 5 and 6 and the main propellent control valves 4 and 14. Bleed lines 7 and 17 permit any trapped vapor or air in the plumbing to vent to their respective propellant tanks. The starting pump 3 boosts the pressure of the monopropellant from booster pump 1b supplied to a gas generator 8, hereinafter described in detail. A thrust control arrangement is provided between the check valves 5 and 6 and the gas generator 8 in order to control the amount of monopropellant flowing into the gas generator. The thrust control device comprises a thrust chamber pressure pick-up 13, a conventional transducer 15 for converting the pneumatic pressure to an electrical signal, a magnetic amplifier 16 with a phase correction circuit for amplifying the signal, a hydraulic servo valve 18, a piston-type ram 19 actuated by the valve 18 and a flutter valve 9, actuated by the ram, to control monopropellent flow to the gas generator. The servo valve 18 typically includes a solenoid 36 with a spring loaded core 37, actuatable by the signal from the amplifier 16. The core 37 is attached to a floating piston 38 which controls the flow of fluid from a separate hydraulic source or from the booster pump 11b to ports 66 and 67, dependent upon the core position. Relative flow into ram chambers 68 and/or 69 determines the position of ram 19 and flutter valve 9.

The gas generator 8 is designed for direct delivery of hot gases to a turbine nozzle box 20 without the complexity of a regeneratively cooled chamber or dilutent cooling. The gas generator 8 comprises a screen decomposition pack 21 or suitable pellet bed which has been activated to function as a catalyst for the decomposition of the monopropellant. A typical catalytic pack, usable in the present invention, may comprise multiple layers of fine mesh screen wire which has been silver-plated and left with considerable surface roughness. When the monopropellant is hydrogen-peroxide, the layers are ordinarily activated by a potassium-permanganate dip. The gas generator 8 supplies steam to the nozzle box 20 which drives a single-stage turbine 22 which is connected to the monopropellent pump 2 and the fuel pump 12 through a common drive shaft 23. Waste steam is exhausted at 24. Operation of the turbo pump 22 driving the pumps 2 and 12, respectively, builds up the monopropellent and liquid propellent pressures in the monopropellent lines and liquid propellent lines 25 and 26, respectively, until predetermined values are reached.

Upon the attainment and sense of a predetermined pressure on the monopropellent valve 4, such valve is opened.

At the same time or prior thereto a pressure switch is ordinarily provided at 27 to shut off the starting pump 3. Flow of monopropellant continues through check valve 6, gas generator 8 and into the driving turbo pump 22. When the valve 4 opens, the monopropellant flows regeneratively through the walls 32 of the thrust chamber 30, acting as a coolant, and into a monopropellent decomposition means or gas generator 28 in communication with the thrust chamber 30. This means may comprise a screen decomposition pack similar in construction to the decomposition pack 21 described above. Decomposition of the monopropellant in the decomposition pack produces steam and free oxygen which are injected into the rocket thrust chamber 30 raising the temperature and pressure therein, and giving a partial thrust. The main fuel valve 14 is opened upon attainment of a predetermined raised pressure within the thrust chamber built up by the gaseous products from the decomposition and is communicated to that valve by line 35. When the valve 14 opens, a sudden rush of fuel is injected by the fuel injector 31 into the thrust chamber 30 where it enters a hot zone of gases, mixes with the available oxygen from the monopropellant decomposition, ignites spontaneously, and burns creating full thrust. The combustion products are then ejected through the throat 33 to provide useful thrust. The rocket engine further comprises a double-wall construction shown at 32 through which the monopropellant passes in regeneratively cooling relationship, the throat section 33 and a nozzle section 34. The gas generator throttle valve 9 is controlled by the thrust chamber pressure through line 35 to control the flow of monopropellent into the gas generator 8 and keep the turbine pump 22 at rated output during the firing duration.

Fig. 2 illustrates a modification of the device shown in Fig. 1. Like designations are shown on parts which are the same in Figs. 1 and 2. Monopropellant coming in inlet 1 by reason of booster pumps (not shown) in the propellent tank or source is pumped by starting pump 3 through check valve 5, control valve 40, and solenoid valve 41 to the gas generator 8. The control valve 40 is of the butterfly type and is actuated by the piston means 42 in conjunction with the hereinafter described servo valve 43. The monopropellant is decomposed into gaseous products by the screens 21 which then pass into the nozzle box 20, the steam turbine 22, and the turbine exhaust 24. The steam turbine turns the shaft 23 which in turn drives the monopropellent pump 2 and the liquid propellent pump 12 building up pressures in lines 25 and 26. Bleed orifices 7 and 17 are provided for carrying off vapor or trapped air in the plumbing and thus preclude the possibility of erratic or delayed starts and uneven firings caused by discontinuities in propellent flow into the thrust chamber or gas generator. A main monopropellent valve 55 and a main liquid propellent valve 56 are linked to a valve 54 which is opened upon the attainment of a predetermined pressure in the monopropellent line 25 due to the increase in pumping rate of pump 2. Actuation of valve 54 opens the valves 55 and 56, the opening of the former allowing flow of monopropellant through the coolant passages 32 in regeneratively cooling relationship with the thrust chamber 30 into the main gas generator 28. The monopropellant is decomposed in the gas chamber 28 by the decomposition pack 29 and is injected as steam and oxygen gaseous products into the chamber 30. A lag is provided in the flow of the liquid propellant into the thrust chamber by providing an elongated plug 56a on the valve 56 such that valve 55 opens prior to valve 56. The liquid propellant thus arrives in the thrust chamber after a sufficient pressure and temperature have been built up in the thrust chamber by the decomposition of the monopropellant in the gas generator 28. It is at this point that the rocket engine is operating at full thrust.

In addition to the aforementioned structure, the rocket engine of Fig. 2 includes a device for injecting catalyst into the decomposition packs 21 and 29. A normally closed valve 47, hereinafter described in Fig. 3, is operated as part of a firing circuit and controls the admittance of a catalytic fluid into each of the gas generators 8 and 28. A catalyst pump 46 is provided actuated by liquid propellant pressure as received from the liquid propellant tank booster pump (not shown). The liquid propellant (in line 26) acts against a charge of liquid catalyst through a diaphragm 46a. A diaphragm-mounted, piston type valve 44 closes the port to the supply tank 48 as the diaphragm deflects and the liquid catalyst charge is pressurized for injection (after the catalyst valve 47 opens). A spring 45 may be added to return the diaphragm and piston valve to the recharge position when the liquid propellant pressure is released at shut-down. The injection of catalyst by the pump 46 and diaphragm 46a is made through the valve 47 and the injecting lines 49 and 50. When the catalyst solenoid valve 47 opens, a "slug" of pressurized catalyst is released from the catalyst pump and is injected through line 50 into the catalyst pack of the gas generator 8 simultaneously with the monopropellent injection through valves 40 and 41. The remaining volume of the catalyst is injected into the decomposition pack 29 through line 49, arriving before the main flow of monopropellant through the line 25 and valve 55. The opening stroke of the catalyst solenoid valve 47 closes a micro-switch permitting the gas generator solenoid valve 41 to open.

The servo valve 43 is the master unit of the automatic control system. Its primary function is to sense thrust chamber pressure and regulate the turbo pump 22 accordingly. Changes in thrust chamber pressure cause displacement of a floating piston 60 which is using a constant pressure liquid propellant pressure (from tank booster pump) as a reference. A restricted bleed line 61 at the inlet to the servo valve prevents a large variation in this reference pressure because of regulator 58 leakage. Sliding valves 62 and 63 uncover ports admitting a corrective amount of liquid propellant through line 64 (at turbo pump pressure) to the proper side of the piston-type actuator 42 and draining fuel from the opposite cavity. This actuator 42 controls a butterfly valve 40 which controls the amount of monopropellant going into the gas generator 8 which, in turn, controls the speed of the turbo pump 22. Overboard drains 60a are provided in the servo valve 43 to vent the cavities behind the pistons 62 and 63.

Provision is made in the rocket engine feed system of Fig. 2 for a gaseous purge of that system following shut-down of the system and in preparation for a subsequent re-start. A solenoid operated purge valve 52 is provided which controls the admittance of a purging gas, such as nitrogen, into the plumbing 53 downstream of the monopropellent main valve 55. The purge gas is contained in a means 51 and normally passes through a pressure regulator 59. A purge line 65 also extends to the upstream side of the solenoid valve 41 in order to purge gas generator 8 and steam turbine 22, stopping all residual vaporization. The purge valve 52 is energized through a limit switch 83 (Fig. 3) actuated on the return stroke of the main valve 54.

Shut-down of the rocket engine illustrated in Fig. 2 is initiated by any interruption of the firing circuit from the hereinafter described safety control devices or by release of the "arm" or "fire" switches. Upon interruption the following events take place in proper sequence. The gas generator shut-off valve 41 is closed by a force supplied by spring 41a and the turbo pump 22 quickly stops, decreasing thrust chamber pressure. When the pressure of the monopropellant drops below a predetermined value the main liquid propellant and monopropellant valves 56 and 55 are closed by spring force, with the liquid propellant flow shut-off first due to the aforementioned valve port design at 56a. Opening of the purge valve 52 cleans all manifolds, the rocket engine jacket and the catalyst pack, stopping all residual vaporization. The catalyst valve also closes. When the liquid propellant pump pressure decreases below the spring force against the catalyst pump 46, the piston 44 returns to the starting position, thereby refilling the pump cylinder with catalyst in preparation for the next firing of the engine. The purge valve 52 is thereafter automatically reset by a time delay relay 76 (Fig. 3).

Fig. 3 shows an electrical schematic diagram for the rocket engine feed system shown in Fig. 2. A bus bar 70 supplies the necessary current for the entire operation of the rocket engine. The "arm" switch is shown at 71 which operates shut-off valves 73 and 74 in the monopropellant source and the liquid propellant source respectively. The "fire" switch 75 actuates the starting pump 3 (Fig. 2) through the relay 85, the propellent booster pump relays 78 and 79, and the catalyst solenoid valve 47. The booster pumps may be actuated by the "arm" switch as in Fig. 1 or by the "fire" switch as in Fig. 2. The opening stroke of the catalyst solenoid valve 47 closes a micro-switch 80 permitting the gas generator solenoid valve 41 to open. In Fig. 3 a pressure switch 27 is provided for shutting off the starting pump 3 through contacts 86, when sufficient pressure has been built up in line 25 to enable the monopropellant to pass through check valve 6 (Fig. 1). An over-pressurization switch 57 and turbopump overspeed trip 77 are provided as safety devices, to break micro-switches 81 and 84 upon the happening of excess pressures in the thrust chamber 30 and turbopump, respectively. When the "fire" switch is put on the off position in a shut-down procedure, the purge solenoid valve 52 is energized until the time delay relay 76 opens the contacts 82. Release of the "arm" switch 71 completes the electrical shut-down operation. The electrical circuits are de-energized and all components are then in the off position. The arming circuit may be left energized if the engine is to be re-fired during the particular flight.

As stated before, it is necessary that a monopropellant be used as one of the elements of the propellent combination. Monopropellants generally are not suitable as a rocket engine propellant due to the lack of a stoichiometric ratio between the fuel and oxidizer components of the monopropellant. In the case of hydrogen-peroxide, this monopropellant is considered to be short on fuel necessitating the additional use of a hydrocarbon fuel, such as JP–4 fuel (an aliphatic hydrocarbon containing less than twenty-five percent aromatic hydrocarbons distilling between 80°–250° C.), to be used in conjunction therewith. In the case of hydrazine and nitromethane, other typical monopropellants, addition of more oxidizer (liquid oxygen, liquid fluorine, or nitric acid, for example) is necessary to give optimum performance.

The reliability in starting the rocket engine of the present invention is predicated mainly upon the use of a monopropellant as the fuel or oxidizer component of the propellent combination, the actuation of the monopropellent main valve (to the thrust chamber) by monopropellent pressure, and delay in injection of the other component of the propellent combination until a hot zone has been established in the thrust chamber at an operational pressure. Smooth, steady operation of the disclosed rocket engine is obtained mainly by the use of the hot zone in the thrust chamber (from the hot gaseous products of the monopropellent decomposition) as a means to stabilize the flame front, by injecting a liquid component into the gaseous products of decomposition present in the thrust chamber, and by sensing the thrust-chamber pressure to regulate the turbopump (through the controller 9 or 40) thereby insuring constant rated thrust. Safe and clean shut-downs of the rocket engine, insuring repeatable operation, are attained by locating the main monopropellent valve upstream of the thrust chamber manifold and cooling jacket thereby eliminating deformation of the jacket during shut-down due to pressure surges, by providing a monopropellent lag during the shut-down sequence by providing a valve port design which shuts off flow of the other component prior to cessation of the monopropellent flow, and, in the case of the Fig. 2 modification, by providing a purge system.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A rocket engine feed system comprising a monopropellant, a liquid propellant, a normally closed monopropellent valve actuatable upon the attainment of a predetermined monopropellent pressure, a decomposition means within a rocket engine thrust chamber, said monopropellent valve allowing continuous flow of all increments of said monopropellant through said decomposition means, means consisting of the decomposition products of said monopropellant to build up pressure in said thrust chamber, a liquid propellant valve actuatable to an open position upon the attainment of a predetermined pressure in said thrust chamber, and means downstream of said liquid propellant valve to inject said liquid propellant into said thrust chamber.

2. The invention as set out in claim 1 in which the liquid propellant is a fuel.

3. A rocket engine comprising a thrust chamber, a monopropellent decomposition pack in communication with said chamber, a monopropellent valve adapted to continuously feed all increments of a monopropellant through said pack and the resultant decomposition products into said thrust chamber, said valve being actuatable upon the attainment of a predetermined monopropellent pressure, a propellent valve adapted to feed a propellant into said thrust chamber and means insuring a lag in the feeding of propellant with respect to the feeding of monopropellent decomposition products, each into said thrust chamber.

4. A rocket engine comprising a thrust chamber, a source of hydrogen peroxide monopropellant, a source of fuel, a catalytic decomposition pack for hydrogen peroxide in communication with said chamber between said hydrogen peroxide source and said chamber, a hydrogen peroxide valve adapted to continuously feed hydrogen peroxide from said source into said pack and being actuatable upon the attainment of a predetermined hydrogen peroxide pressure, the discharge from said pack consisting of the gaseous products of decomposition of said hydrogen peroxide, a fuel valve adapted to feed fuel from said source into said thrust chamber after a time lag with respect to entry of said products into said chamber and after the attainment of a predetermined pressure of said products in said chamber, all increments of the hydrogen peroxide from said source being conducted through said pack whereby said fuel is prevented from contacting raw hydrogen peroxide in said chamber.

References Cited in the file of this patent

UNITED STATES PATENTS

| 2,605,609 | Bush | Aug. 5, 1952 |
| 2,659,197 | Halford | Nov. 17, 1953 |
| 2,706,887 | Grow | Apr. 26, 1955 |

FOREIGN PATENTS

| 680,717 | Great Britain | Oct. 8, 1952 |
| 680,718 | Great Britain | Oct. 8, 1952 |

OTHER REFERENCES

"How Nazis' Walter Engine Pioneered Manned Rocket-Craft," by Roy Healy, Aviation, January 1946, pages 77–80.